US009647984B2

(12) United States Patent
Merrien et al.

(10) Patent No.: US 9,647,984 B2
(45) Date of Patent: May 9, 2017

(54) SYSTEM AND METHOD FOR SECURELY USING MULTIPLE SUBSCRIBER PROFILES WITH A SECURITY COMPONENT AND A MOBILE TELECOMMUNICATIONS DEVICE

(75) Inventors: Lionel Merrien, Montreal (CA); Serge Barbe, La Bouilladisse (FR)

(73) Assignee: GEMALTO SA, Meudon (FR)

( * ) Notice: Subject to any disclaimer, the term of this patent is extended or adjusted under 35 U.S.C. 154(b) by 149 days.

(21) Appl. No.: 13/814,067

(22) PCT Filed: Aug. 4, 2011

(86) PCT No.: PCT/EP2011/063493

§ 371 (c)(1),
(2), (4) Date: Jul. 11, 2013

(87) PCT Pub. No.: WO2012/017059

PCT Pub. Date: Feb. 9, 2012

(65) Prior Publication Data

US 2013/0283047 A1    Oct. 24, 2013

Related U.S. Application Data

(60) Provisional application No. 61/371,149, filed on Aug. 5, 2010, provisional application No. 61/371,152, filed on Aug. 5, 2010.

(51) Int. Cl.
*H04L 29/06* (2006.01)
*H04W 4/00* (2009.01)
(Continued)

(52) U.S. Cl.
CPC ............ *H04L 63/00* (2013.01); *H04L 63/102* (2013.01); *H04L 67/306* (2013.01); *H04W 4/00* (2013.01);
(Continued)

(58) Field of Classification Search
CPC ...... G06F 21/57; G06F 21/53; G06F 21/6218; G06F 21/74; G06F 21/10
See application file for complete search history.

(56) References Cited

U.S. PATENT DOCUMENTS 6,687,800 B1 *   2/2004   Nassor ................. G06Q 20/341
                                                                  711/115
2005/0239504 A1 * 10/2005   Ishii .................. H04M 1/72525
                                                                  455/558

(Continued)

FOREIGN PATENT DOCUMENTS

DE          19511031 C2     10/1996
DE       102004011838 A1     9/2005
(Continued)

OTHER PUBLICATIONS

International Search Report (PCT/ISA/210) issued on Nov. 10, 2011, by the European Patent Office as the International Searching Authority for International Application No. PCT/EP2011/063493.
(Continued)

*Primary Examiner* — Farid Homayounmehr
*Assistant Examiner* — Sanchit Sarker
(74) *Attorney, Agent, or Firm* — Buchanan Ingersoll & Rooney PC

(57) ABSTRACT

System and method for allowing a mobile telecom device to use multiple profiles. The system and method includes operating a security function to perform a cryptographic operation on a profile using a cryptography key of the security function thereby producing a cryptographically protected profile, storing the cryptographically protected profile, and activating the cryptographically protected profile by operating the security function to verify that the cryptographically protected profile has been cryptographically protected using the cryptography key of the security function, and upon verifying that the cryptographically (Continued)

protected profile has been protected using the cryptography key of the security function, activating the cryptographically protected profile.

13 Claims, 10 Drawing Sheets

(51) Int. Cl.
*H04L 29/08* (2006.01)
*H04W 12/08* (2009.01)
*H04W 12/02* (2009.01)

(52) U.S. Cl.
CPC ........... *H04W 4/001* (2013.01); *H04W 12/08* (2013.01); *H04L 63/0428* (2013.01); *H04W 12/02* (2013.01)

(56) References Cited

U.S. PATENT DOCUMENTS

| | | | |
|---|---|---|---|
| 2005/0278535 A1* | 12/2005 | Fortune | G06F 8/61 713/176 |
| 2005/0279826 A1* | 12/2005 | Merrien | G06Q 20/341 235/380 |
| 2008/0084972 A1* | 4/2008 | Burke | G06Q 10/107 379/88.02 |
| 2008/0261561 A1* | 10/2008 | Gehrmann | H04W 12/04 455/411 |
| 2009/0163175 A1* | 6/2009 | Shi | H04W 8/205 455/411 |
| 2009/0199296 A1* | 8/2009 | Xie | G06F 21/316 726/23 |
| 2009/0241040 A1* | 9/2009 | Mattila | G06F 3/0481 715/760 |
| 2010/0037047 A1* | 2/2010 | Varriale | G06F 21/6209 713/165 |
| 2010/0223461 A1* | 9/2010 | Drader | G09C 5/00 713/159 |
| 2010/0311402 A1* | 12/2010 | Srinivasan | H04W 8/183 455/418 |
| 2011/0219229 A1* | 9/2011 | Cholas | G06F 21/00 713/168 |
| 2011/0294472 A1* | 12/2011 | Bramwell | H04W 8/04 455/413 |
| 2013/0012168 A1* | 1/2013 | Rajadurai | H04L 9/0822 455/411 |
| 2013/0283047 A1* | 10/2013 | Merrien | H04W 12/08 713/164 |
| 2014/0179271 A1* | 6/2014 | Guccione | G06F 21/10 455/410 |
| 2016/0301529 A1* | 10/2016 | Park | H04W 12/10 |

FOREIGN PATENT DOCUMENTS

| | | |
|---|---|---|
| EP | 2083589 A1 | 7/2009 |
| JP | 2002369260 A | 12/2002 |
| JP | 2004102516 A | 4/2004 |
| WO | WO 99/62282 A1 | 12/1999 |
| WO | 03077587 A1 | 9/2003 |
| WO | 2005117478 A1 | 12/2005 |
| WO | 2006133934 A1 | 12/2006 |
| WO | WO 2007/045257 A1 | 4/2007 |
| WO | 2008128874 A1 | 10/2008 |
| WO | WO 2009/133410 A2 | 11/2009 |

OTHER PUBLICATIONS

Written Opinion (PCT/ISA/237) issued on Nov. 10, 2011, by the Japanese Patent Office as the International Searching Authority for International Application No. PCT/EP2011/063493.

Japanese Office Action issued on Feb. 25, 2014, by the Japanese Patent Office in corresponding JP Application No. 2013-522260 (6 pages).

"3rd Generation Partnership Project; Technical Specification Group Services and Systems aspects; Feasibility study on the security aspects of remote provision and change of subscription for Machine to Machine (M2M) equipment (Release9)" 3 GPP TR 33.812 V9.1.0 (Apr. 2010) (87 pages).

Barriga, Luis et al. "M2M Remote-Subscription Management," Enabling M2M Device Connectivity; Ericsson Review 2011 (6 pages).

Kuzuu, Kasuhito et al. "Application to a Shared Terminal of a Roaming User Profile set up through LDAP-Smart Card Authentication Cooperation," The IEICE Transactions; The Institute of Electronics, Information and Communication Engineers; D Wol. J92-D, No. 1 (pp. 39-50) (full English translation).

English translation of Opposition filed in Mar. 2015 in corresponding European Application No. 2011063493 filed on Aug. 4, 2011 (12 pages).

* cited by examiner

SYSTEM AND METHOD FOR SECURELY USING MULTIPLE SUBSCRIBER PROFILES WITH A SECURITY COMPONENT AND A MOBILE TELECOMMUNICATIONS DEVICE

CROSS-REFERENCE TO RELATED APPLICATIONS

This application is a PCT application claiming priority from U.S. provisional applications Ser. No. 61/371,149, filed on 5 Aug. 2010, entitled "Perso Package" and U.S. provisional applications Ser. No. 61/371,152, filed on 5 Aug. 2010, entitled "SIM WALLET," the teachings of which are incorporated by reference herein as if reproduced in full below.

BACKGROUND OF THE INVENTION

The present invention relates generally to telecom and more particularly to the ability to provide a multi-subscription application managed by a security component such as a UICC (Universal Integrated Circuit Card) directly.

The problem addressed by the present invention is how to securely switch between different profiles and network access technology from a mobile device, with no limit to the number of profiles being supported.

A scenario in which it is useful to have multiple subscriptions is when one is travelling between geographic areas served by different operators. This is usually referred to as roaming. When roaming into a visited network, a user pays roaming charges which generally are much more expensive than those charged by either the home network or the visited network operators. To get around that problem, users who frequently engage in such travel may try the solution of carrying multiple mobile devices, e.g., "my Canadian cell phone," "my French cell phone" or "my Swedish cell phone," with each cell phone being used with an operator in the corresponding country. Of course, this jostling of several units is very burdensome on the user.

Another solution is to switch out the UICC. However, there are at least two problems with that particular solution. First, the user would have to remember to carry along multiple UICCs and to know which to use in each location. Second, there is a growing trend towards embedded UICCs. In a mobile device with an embedded UICC it is not possible, at least not at the user level, to readily access the UICC and replace it.

One existing alternative solution to the problem described above is known as the multi-IMSI application, in which an application inside the UICC can switch between different credentials, based on some external trigger. This alternative solution has two limitations:

The number of different credentials to be supported is limited by the memory of the UICC.

It is difficult to switch between entire profiles, mainly because of limitation of memory in the UICC. Therefore the multi-IMSI application only switches the credentials (keys and codes) and some selected data (e.g. the roaming files). The rest of the profile must be shared.

In multi-IMSI applications, only some parameter values of a profile are switched with other values, e.g., IMSI and telephone number. However, there is not a switch of an entire profile.

One limitation, thus, of the multi-IMSI solution is that, because entire profiles are not switched, the two operators must have the same profile format in order to allow for a switch of profiles when switching from one operator to another. That is often not the case, and therefore the solution is often not a complete and dependable solution allowing for switching of profiles, for example while roaming.

There is a need for an improved method to provide the ability to provide multi-IMSI applications managed directly by a UICC or similar device.

DETAILED DESCRIPTION OF THE INVENTION

Figure 1:
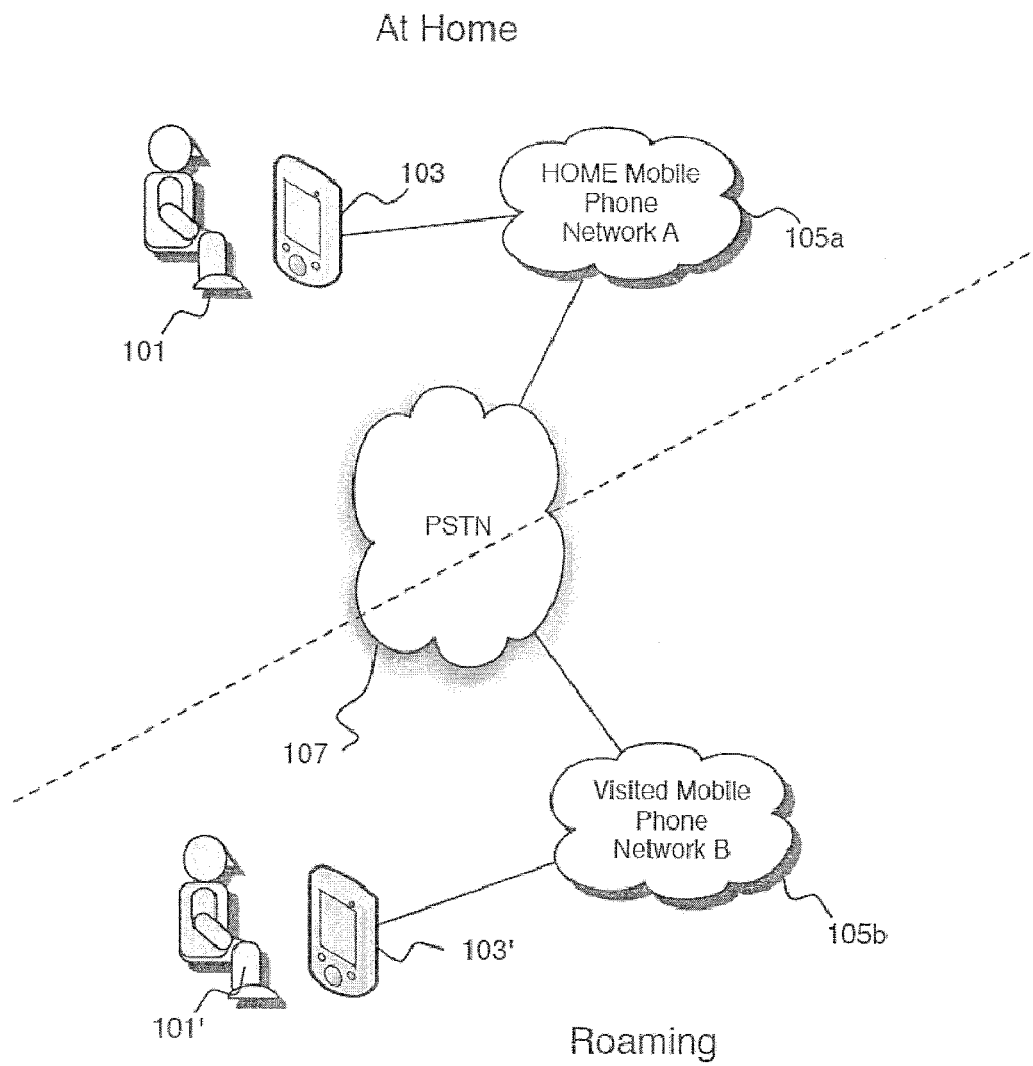
FIG. 1 is a block diagram illustrating the use of a mobile telephony device in a home location and while roaming in a visited mobile network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The technology presented herein provides a powerful, inexpensive, scalable, flexible, and universal solution for allowing a user of a mobile device to switch between different subscriber profiles. One scenario in which that is useful is roaming. Another is to allow an operator to activate an administrator or testing profile on a mobile device to allow the operator to use such a profile instead of the subscriber's own profile when doing administrative tasks or testing a mobile device.

FIG. 1 is a block diagram illustrating the use of a mobile telephony device in a home location and while roaming in a visited mobile network. In the upper portion of FIG. 1 a user 101 is using a mobile device 103 connected to a "Home" mobile phone network A 105a. The home network may be connected to other networks via, for example, the publicly switched telephone network PSTN 107. One such network may be a mobile phone network of another operator B 105b. While connected to the home network 105a the subscriber pays for air-time and other services per a contract directly with the home network operator A.

In the lower portion of FIG. 1, the user 101' operating the same mobile device 103' is connected to a "Visited" mobile phone network B 105b. That often happens when a user moves into a geographic area not served by the "Home" operator. In order to place or receive telephone calls (or other data communication) the subscriber pays for air-time and other services according to a roaming contract with the Visited network operator B. Usually such charges are much more expensive than what either operator charges its own customers.

Therefore, it would be useful to the user 101 if he or she could enter into a subscriber relationship with multiple operators and have a mechanism to activate the appropriate subscribe profile for whatever location the user happens to find him- or herself.

Figure 2:
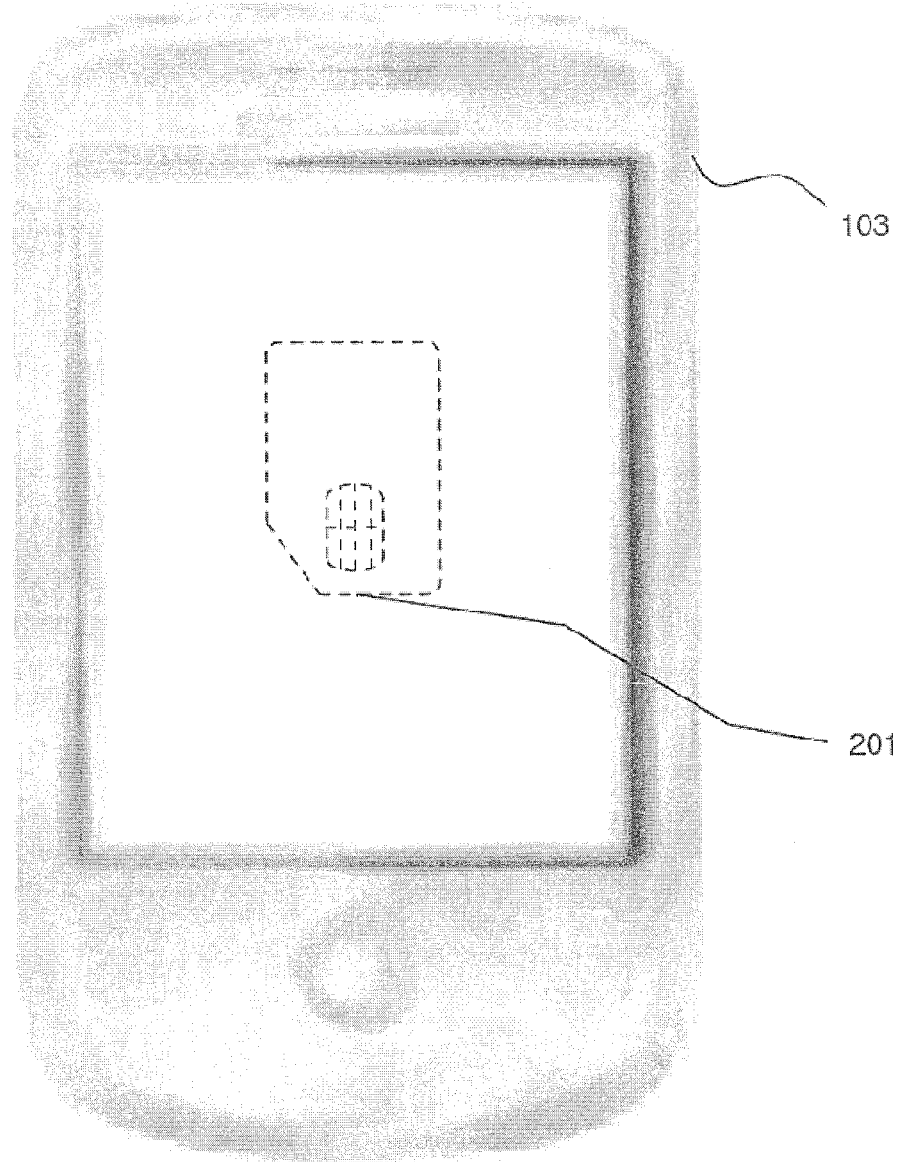
FIG. 2 is a block diagram illustrating a high-level view of one example of a mobile device of FIG. 1 including a UICC embedded in the mobile device.

Turning now to some fundamental aspects of mobile communications technology relevant to the present technology: FIG. 2 is a block diagram illustrating a high-level view of one example of the mobile device 103 of FIG. 1 including a UICC 201 embedded in the mobile device 103. While a reader will recognize that the depicted mobile device 103 is a mobile telephone, also often referred to as a cell phone, the present technology is applicable to any mobile communications device, including but not limited to computers, data modems, cameras, point-of-sale devices, vehicles with onboard communication, or location devices embedded or carried by animals, equipment and human beings.

Both the UICC 201 and the mobile device 103 are computers. Typically they are connected to one another in a master-slave relationship in which the mobile device 103 is the master and the UICC 201 is the slave. The UICC 201 provides certain functions, such as storing subscriber profiles and performing security-critical operations. UICCs are typically tamper-resistant and are therefore very secure devices for storing sensitive information, such as subscriber profile and account information, and to provide secure functions, such as cryptographic operations.

Figure 3:
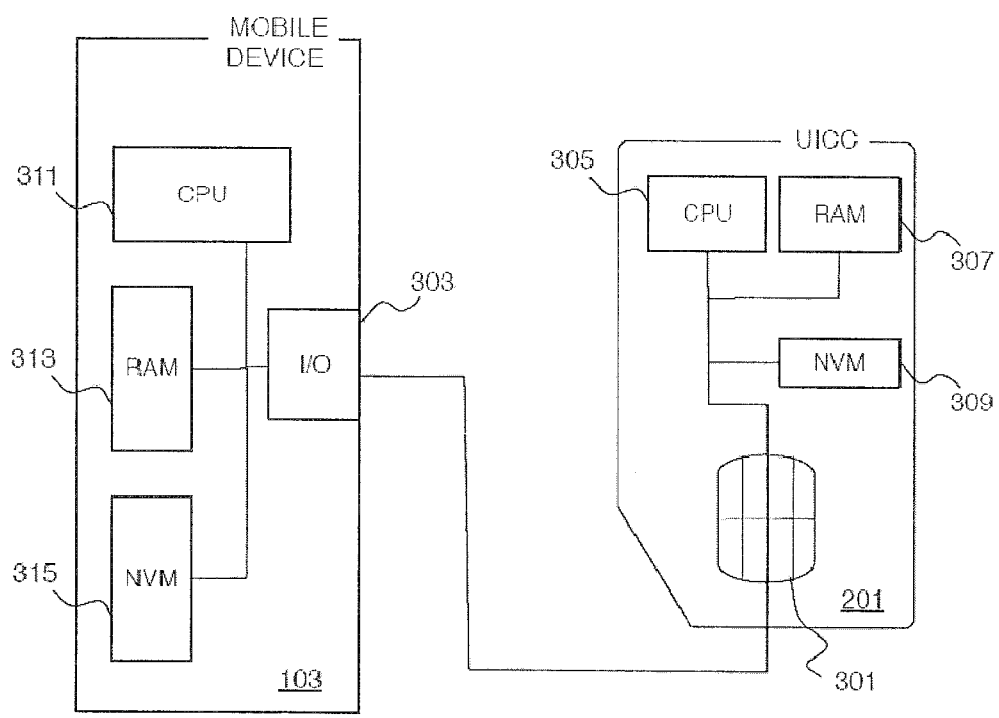
FIG. 3 is a block diagram illustrating one example of a high-level architectural organization of the hardware components of the mobile device and of the UICC of FIG. 2.

FIG. 3 is a block diagram illustrating one example of a high-level architectural organization of the hardware components of the mobile device 103 and of the UICC 201 of FIG. 2. Typically the UICC 201 is connected to the mobile device 103 using the connectors 301 on the UICC 201 and connectors in a card slot (not shown) on the mobile device 103. The mobile device 103 may have a communications interface 303 for facilitating the communication between the two devices. In the present example, on the UICC 201 end, communication is managed directly by a CPU (Central Processing Unit) 305.

The card CPU 305 is further connected to a RANI (Random Access Memory) 307 and a NVM (Non-Volatile Memory) 309. Typically the NVM 309 is used to store information on the UICC 201 that is to persist through power-cycling the UICC 201, e.g., subscriber profiles and application programs of the UICC 201.

The mobile device 103 also contains a CPU 311, a RAM 313, and an NVM 315. The mobile device NVM 313 may be used to store application programs of the mobile device 103.

Figure 4:
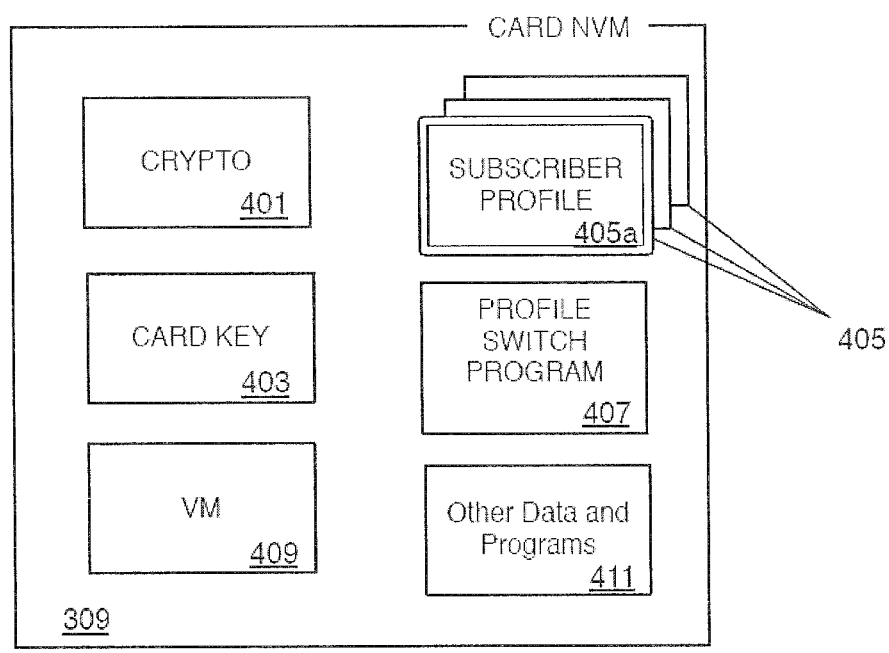
FIG. 4 is a block diagram illustrating programs and data stored in the non-volatile memory of a UICC of FIGS. 2 and 3 including the storage of a subscriber profile.

FIG. 4 is a block diagram illustrating programs and data stored in the non-volatile memory 309 of the UICC 201 of FIGS. 2 and 3 including the storage of a subscriber profile. As noted, the NVM 309 (herein, "NVM" without a modifier should be taken to refer to the UICC NVM 309 unless the context indicates otherwise) is used to store persistent data and programs. This includes a cryptography module 401 for performing cryptographic operations, e.g., encrypting a data item, decrypting an encrypted data item, and cryptographically signing a data item. These cryptographic operations may include public key cryptography or secret key cryptography. In either case, the UICC 201 would have stored thereon, e.g., in the NVM 309, a key (Card Key) 403 that is only known by the UICC 201. (Whereas it is common in computing literature to use anthropomorphic terminology such as "known" by a device, when such usage is employed herein it must be appreciated that this is a figurative use of the term and should be taken to mean that a corresponding operation is performed by the device. E.g., in this instance "known only" means that the data item in question is stored only on that device and not on other devices or cannot be retrieved by other devices) Thus, the card key 403 may be used by the UICC 201 to encrypt data items in such a manner that only the UICC 201 may decrypt them or the card key 403 may be used by the UICC 201 to cryptographically sign a data item so that the UICC 201 (or other devices) may confirm that the UICC 201 in fact is the signer of the signed data item.

The NVM 309 also contains one or more subscriber profiles 405 including one active subscriber profile 405a (illustrated here with a double-line border). In most cases, the NVM 309 would only include one subscriber profile 405, namely, the active subscriber profile 405a. A subscriber profile 405 may include an IMSI, a telephone number, an authentication key for authenticating a subscriber with a particular network, applications associated with the subscriber and a particular network, and any other information that is specific to a subscriber and one particular network with which the subscriber profile is associated.

The card NVM 309 may also contain a special program 407 used to switch subscriber profiles as described herein below.

The card NVM 309 may also contain a virtual machine 409 or other operating system software for controlling the operations of the UICC 201 and other data and programs 411.

Figure 5:
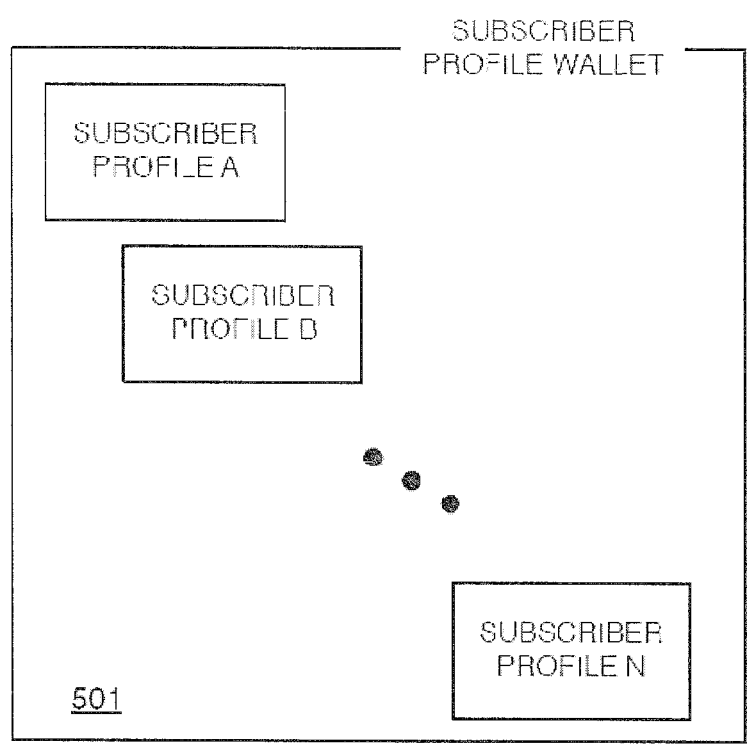
FIG. 5 is a block diagram illustrating one example of a subscriber profile wallet for storing multiple subscriber profiles which may be activated to become the currently active subscriber profile.

In one embodiment of the technology presented herein, multiple subscriber profiles 405 may be associated with a particular user. A user or administrator may select a particular profile from this set of subscriber profiles 405 associated with a user. FIG. 5 is a block diagram illustrating one example of a storage mechanism for such multiple subscriber profiles, namely, a subscriber profile wallet 501 for storing multiple subscriber profiles 405 associated with a user which may be activated to become the currently active subscriber profile on a user's mobile device 103. In the example of FIG. 5, a particular subscriber has n profiles A-N stored in a subscriber profile wallet 501.

Figure 6:
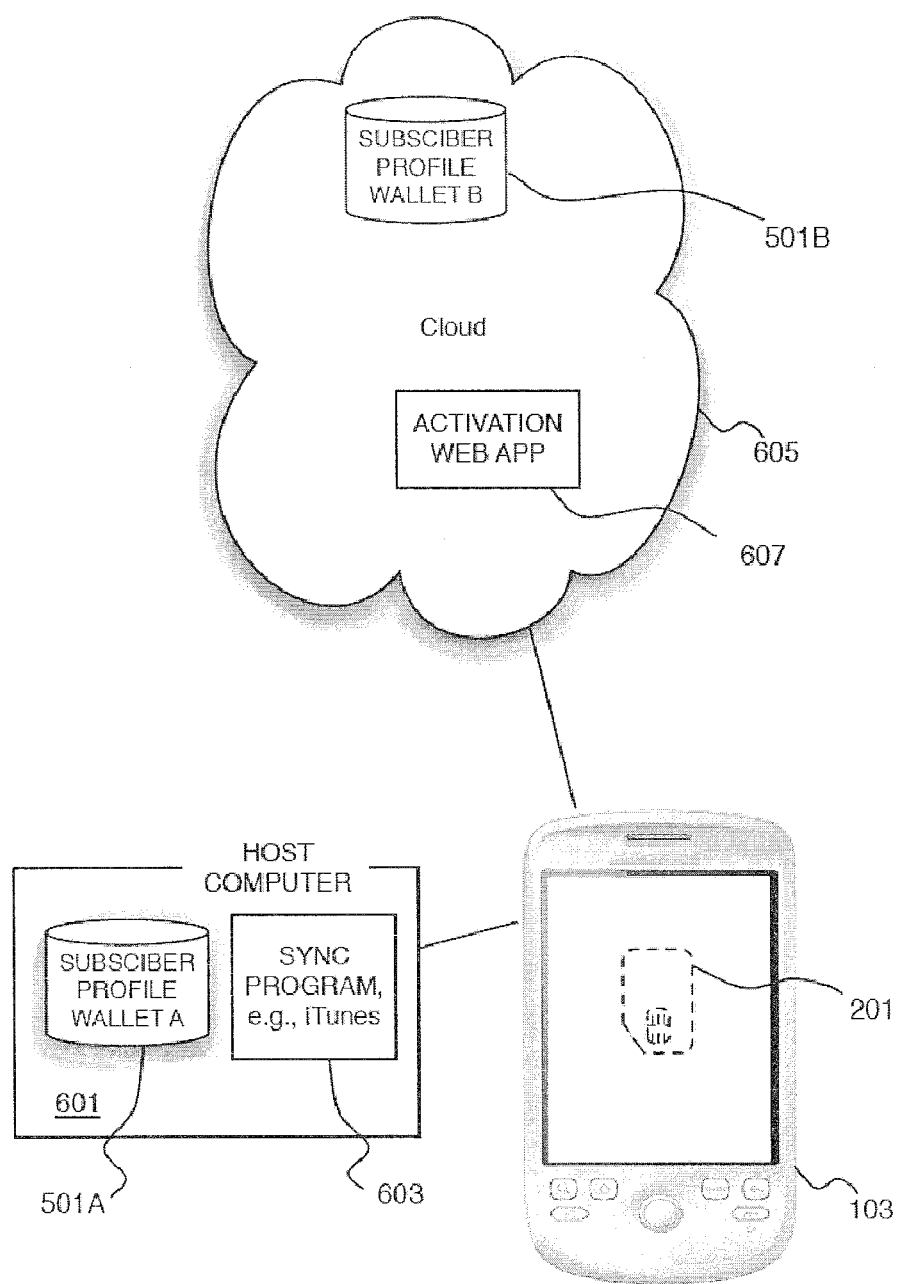
FIG. 6 is a schematic diagram illustrating several example storage locations for the subscriber profile wallet of FIG. 5.

FIG. 6 is a schematic diagram illustrating several example storage locations for the subscriber profile wallet of FIG. 5. The subscriber profile wallets 501 may be stored, for example, on a host computer 601. One example in which a host computer 601 is a useful storage location is the iPhone from Apple Inc., Cupertino, Calif., USA. The iPhone is a mobile device which is typically synchronized (synced) with a computer using the iTunes program on a Mac or PC computer. Via iTunes the contents on the iPhone is synchronized with the host computer 601. Thus, the host computer 601 may contain a synchronization program 603 for synchronizing contents with the mobile device 103. A plug-in or extension (not shown) to that synchronization program may activate new subscriber profiles from the subscriber profile wallet 501A.

In another alternative, the subscriber profile wallet B 501B is stored in the Cloud 605. An activation web application 607, for example, invoked via a web browser on the mobile device 103, may be used to activate a subscriber profile from subscriber profile wallet B 501B in the Cloud 605.

Figure 7:
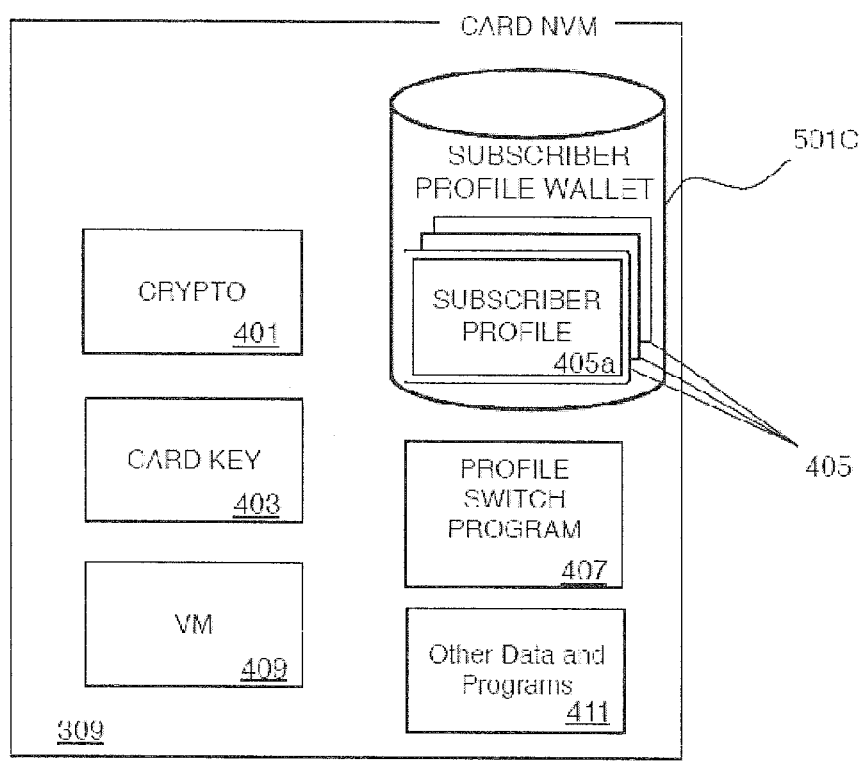
FIG. 7 is a block diagram illustrating programs and data stored in the non-volatile memory of a UICC of FIG. 4 including the storage of a subscriber profile wallet.

In yet another alternative, the subscriber profile wallet C 501C is stored in the NVM 309 of the UICC Card 201 which is illustrated in FIG. 7. Alternatively, for a multi-UICC mobile device, the subscriber profile wallet may be stored on one of the UICCs in the multi-UICC mobile device and the active subscriber profile may be retrieved therefrom.

Figure 8:
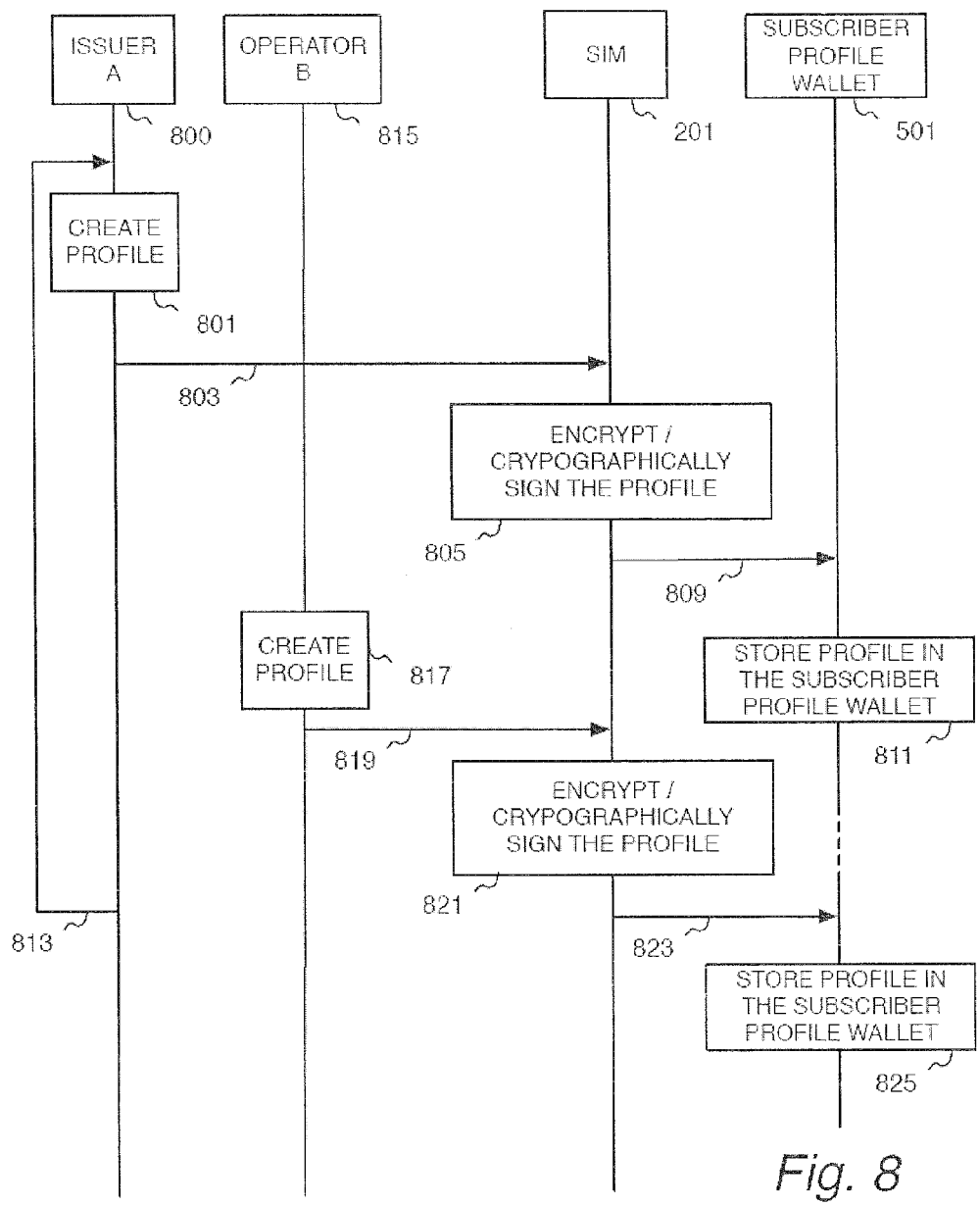
FIG. 8 is a timing sequence diagram illustrating one possible scenario for storage of subscriber profiles in the subscriber profile wallet of FIGS. 5, 6, and 7.

FIG. 8 is a timing sequence diagram illustrating one possible scenario for storage of subscriber profiles in the subscriber profile wallet of FIGS. 5, 6, and 7. In the example of FIG. 8, an issuer A 800 creates one or more subscriber profiles 501, step 801. The profiles are transmitted to the UICC 201, step 803. The UICC 201 encrypts or cryptographically signs the profile using the card key 403, step 805, for example, using the cryptography module 401. The UICC 201 transmits the encrypted or signed subscriber profile to the subscriber profile wallet 501, step 809. The encrypted or signed subscriber profile is stored in the subscriber profile wallet 501, step 811.

The above process may be repeated to create additional encrypted or signed subscriber profiles by the issuer, step 813.

The above steps are advantageously performed during card personalization. Additional profiles may further be created and downloaded to the UICC "over-the-air."

At some future time, for example, a second operator B 815 may create a subscriber profile for the user, step 817. This subscriber profile associates the user with the operator B 815. The subscriber profile is transmitted to the UICC 201, step 819. The UICC 201 encrypts the subscriber profile created by the operator B 815, step 821, and transmits the encrypted or signed subscriber profile to the subscriber profile wallet 501, step 823. The encrypted or signed subscriber profile is stored in the subscriber profile wallet 501, step 825.

Figure 9:
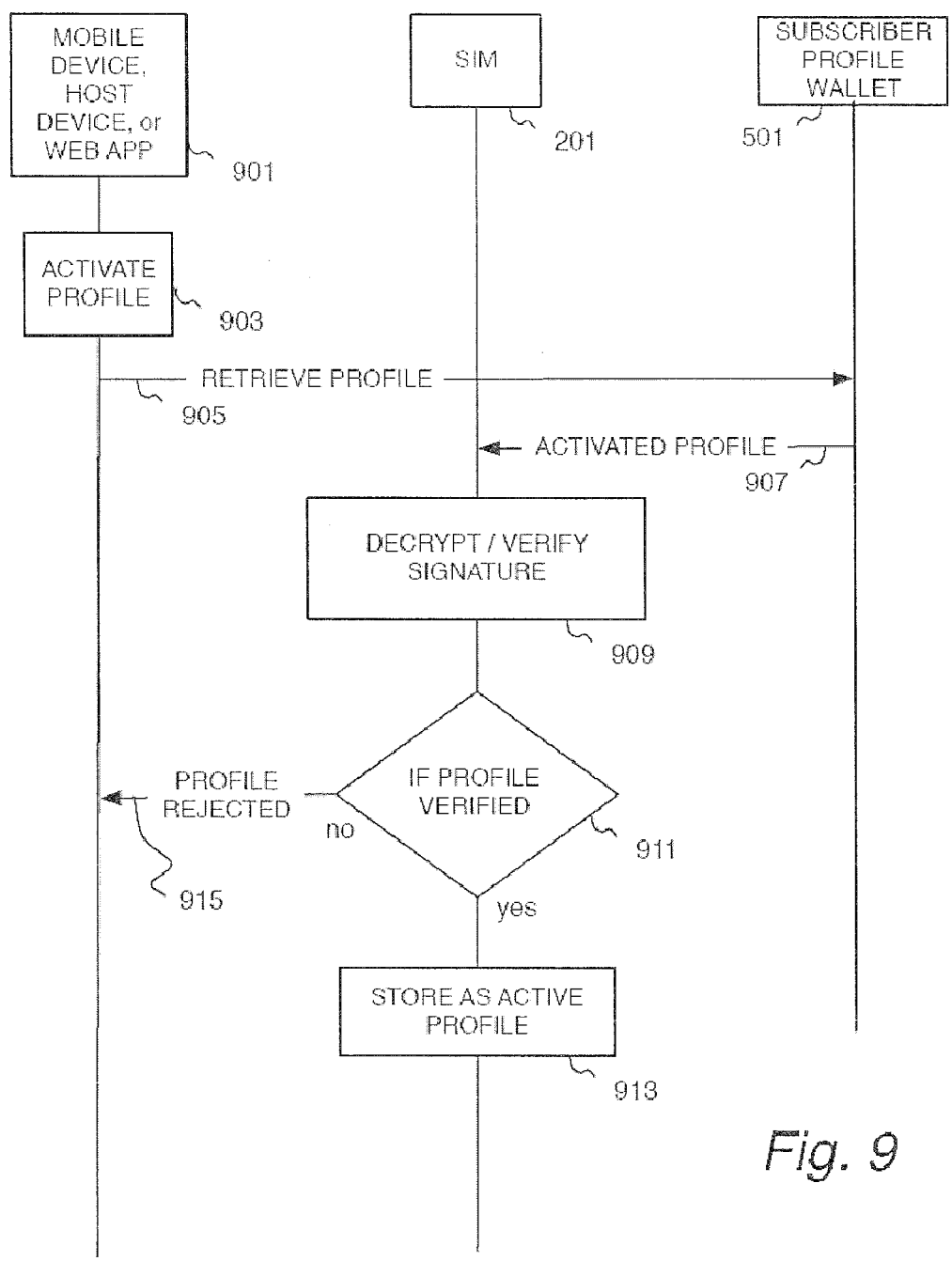
FIG. 9 is a timing sequence diagram illustrating activation of a subscriber profile stored in the subscriber profile wallet of FIGS. 5, 6, and 7.

FIG. 9 is a timing sequence diagram illustrating activation of a subscriber profile stored in the subscriber profile wallet of FIGS. 5, 6, and 7. A mobile device, a host computer device or a web application (collectively) 901 is operated to activate an inactive subscriber profile stored in the subscriber profile wallet 501, step 903. A program executing on the mobile device 103 may act as a profile activator application. This program can either retrieve a subscriber profile from a subscriber profile wallet stored on the mobile device, or from some other location, e.g., the UICC if it stores a subscriber profile wallet or the cloud via a web app.

The program—wherever it is executing—sends a retrieve-active-profile message to the subscriber profile wallet 501, step 905. The subscriber profile wallet transmits the activated subscriber profile to the UICC 201, step 907. At this point the subscriber profile is encrypted or cryptographically signed. Only a subscriber profile that has been encrypted or cryptographically signed by the UICC 201 that originally encrypted or digitally signed the subscriber profile is accepted by that same UICC 201. In other words, the digital signature or encryption maps a subscriber profile to a particular UICC 201 and that UICC 201 only accepts those subscriber profiles that only it has signed or encrypted.

The subscriber profile wallet 501 transmits the subscriber profile that is being activated to the UICC 201, step 907. While this is depicted here as a direct transmission from the subscriber profile wallet 501 to the UICC 201, the transmission may be via one or more intermediaries, e.g., the mobile device 103 to which the UICC 201 is connected or via a host computer 601.

The UICC 201 decrypts the subscriber profile or verifies that it was signed by the UICC 201, step 909. If the signature or decryption indicates that the subscriber profile was signed or encrypted by the UICC 201, step 911, the UICC 201 stores the received subscriber profile as the active subscriber profile, step 913. Conversely, if the profile is not verified to have been encrypted or signed by the UICC 201, a message may be transmitted back that the activation of the subscriber profile has been rejected, step 915.

In an alternative embodiment, a subscriber profile associated with a particular UICC 201 and a particular operator is given a version number. The UICC 201 keeps a database of subscriber profiles that it has signed or encrypted. Thus, in this embodiment, in conjunction with encrypting or signing a profile, steps 805 and 821, the UICC 201 records the version number of the subscriber profile for the operator with which it is associated. In conjunction with the verification of decryption or digital signature, step 909, the UICC 201 confirms that the subscriber profile is the most recent subscriber profile the UICC 201 has processed for that operator. The UICC 201 only activates the most recent subscriber profile for that operator, thus preventing the activation of old subscriber profiles that have either been superseded or modified.

Figure 10:
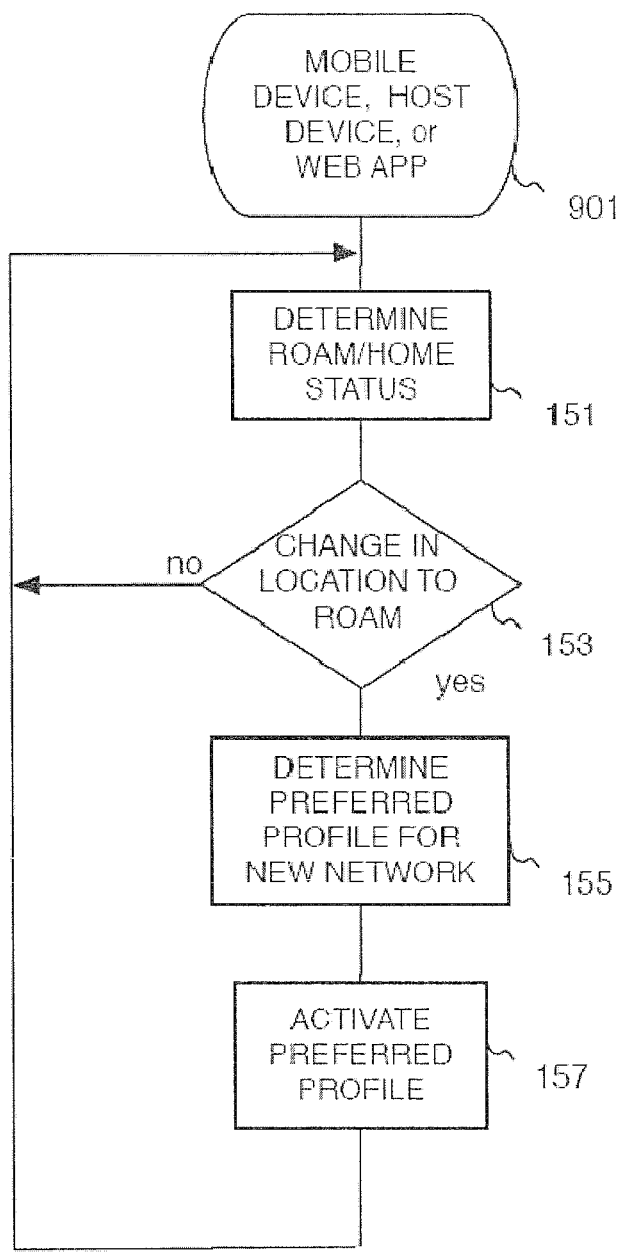
FIG. 10 is a flow-chart illustrating the use of location to trigger activation of a subscriber profile from the subscriber profile wallet.

In an alternative embodiment, activation of a new profile is automatically performed based on the location of the mobile device 103. FIG. 10 is a flow-chart illustrating on scenario for automatic profile change based on location. The mobile device continuously monitors whether in a Home location or in a Roam location, step 151. If the mobile device determines that it has entered into a roaming situation with respect to the currently active subscriber profile 501, step 153, the best profile to use in the new network is selected, step 155, and that profile is activated (as illustrated and discussed in conjunction with FIG. 9), step 157. Of course, if there is no change in network, step 153, nothing is done with respect to subscriber profile. Alternatively, the subscriber profiles in a subscriber profile wallet may be associated with geographical locations, e.g., countries or continents, and a mobile device would operate to trigger a change in subscriber profile based on which geographic location it finds itself. This could, for example, be performed on each start-up of the mobile device and on each hand-off to new cells while travelling through a network.

From the foregoing it will be apparent that a technology is presented herein that provides for an economical, flexible, powerful, scalable, and secure mechanism for creating, managing, and activating subscriber profiles such that mobile devices, including mobile devices with embedded UICCs, may be used with multiple operators using subscriptions with each of such multiple operators. The technology may further be utilized to allow an operator to activate an administrative profile on a mobile device, for example, to allow for administration or testing of the mobile device.

In an alternative embodiment, the security functions, e.g., cryptography and storing of cryptographic keys, may be performed in a secure zone of the mobile device 103 without relying on a separate UICC 201 to host that functionality. The technology described herein for providing a user secure access to multiple subscriber profiles which each may be linked to a separate operator may be implemented in such a secure zone of the mobile device 103 or in any other way in which the security functions, such as cryptography and secure management of cryptographic keys, may be implemented. Herein, for ease of explanation, the security function is described as hosted on a UICC 201. However, that is to be taken as illustrative only.

Although specific embodiments of the invention have been described and illustrated, the invention is not to be limited to the specific forms or arrangements of parts so described and illustrated. The invention is limited only by the claims.

We claim:

1. A method for allowing a user of a mobile telecom device to use multiple subscriber profiles, comprising:
    (a) operating a security function to perform, by a portable security device, a cryptographic operation on one subscriber profile stored in a tamper-resistant element cooperating with said mobile telecom device, by using a cryptography key of said security function thereby producing a cryptographically protected subscriber profile, wherein said one subscriber profile is associated with one particular network; and
    (b) exporting said cryptographically protected subscriber profile outside said tamper-resistant element;
    (c) importing said cryptographically protected subscriber profile into said tamper-resistant element;
    (d) when importing said cryptographically protected subscriber profile into said tamper-resistant element, operating said security function to verify that said cryptographically protected subscriber profile has been cryptographically protected for said tamper-resistant element;
    (e) verifying that the cryptographically protected subscriber profile has been cryptographically protected for said tamper-resistant element; and
    (f) upon verifying that the cryptographically protected subscriber profile has been cryptographically protected for said tamper-resistant element, activating said cryptographically protected subscriber profile in said tamper-resistant element, in order that only a subscriber profile that has been encrypted or cryptographically signed for said tamper-resistant element is activated in said tamper-resistant element.

2. The method of claim 1, wherein said portable security device is a universal integrated circuit card ("UICC").

3. The method of claim 1, wherein said security function is performed by a secure zone of said mobile telecom device.

4. The method of claim 1, wherein a subscriber profile includes the full set of data associating a particular subscriber to an operator.

5. The method of claim 1, wherein a profile comprises the specific applications or OS modifications specific to an operator.

6. The method of claim 1, wherein step (b) comprises exporting the cryptographically protected subscriber profile to a storage device selected from the set including a portable security device, said mobile telecom device, a server connected to said mobile telecom device, and a server located on a network accessible by said telecom device.

7. The method of claim 6, further comprising retrieving said cryptographically protected subscriber profile from said storage device.

8. The method of claim 1, wherein step (a) comprises encrypting said subscriber profile using a secret key of said security function.

9. The method of claim 1, wherein step (a) comprises digitally signing said subscriber profile using a secret key of said security function.

10. The method of claim 1, wherein step (d) deactivating a currently active subscriber profile.

11. The method of claim 1, further comprising determining a location of said mobile telecom device, wherein step (a) comprises using the location of said mobile telecom device to determine which cryptographically protected subscriber profile to activate and to automatically activate a cryptographically protected subscriber profile upon a change in location dictating use of a different cryptographically protected subscriber profile.

12. A portable security device comprising:
    a memory; and
    a processor, wherein the processor of said portable security device is configured to execute the following method steps:
        operate a security function to perform a cryptographic operation on a subscriber profile stored in a tamper-resistant element cooperating with a mobile telecom device, by using a cryptography key of said security function, thereby producing a cryptographically protected subscriber profile, wherein said subscriber profile is associated with one particular network;
        export said cryptographically protected subscriber profile from said tamper-resistant element; and
        when importing said cryptographically protected subscriber profile into said tamper-resistant element, operate said security function to verify that said cryptographically protected subscriber profile has been cryptographically protected for said tamper-resistant element, and upon verifying that said cryptographically protected subscriber profile has been cryptographically protected for said temper-resistant element, activate the cryptographically protected subscriber profile in said tamper-resistant element, in order that only a subscriber profile has been encrypted or cryptographically signed for said tamper-resistant element is activated in said tamper-resistant element.

13. A non-transitory computer readable medium of a portable security device having stored thereon instructions to cause a processor of said portable security device to execute the following method steps:
    operate a security function to perform a cryptographic operation on a subscriber profile stored in a tamper-resistant element cooperating with a mobile telecom device, by using a cryptography key of said security function thereby producing a cryptographically protected subscriber profile, wherein said subscriber profile is associated with one particular network;

export said cryptographically protected subscriber profile from said tamper-resistant element; and when importing said cryptographically protected subscriber profile into said tamper-resistant element, operate said security function to verify that said cryptographically protected subscriber profile has been cryptographically protected for said tamper-resistant element, and upon verifying that said cryptographically protected subscriber profile has been cryptographically protected for said tamper-resistant element, activate said cryptographically protected subscriber profile in said tamper-resistant element, in order that only a subscriber profile that has been encrypted or cryptographically signed for said tamper-resistant element is activated in said tamper-resistant element.

\* \* \* \* \*